United States Patent [19]

Yamada et al.

[11] 4,325,562
[45] Apr. 20, 1982

[54] THREE-WHEELED VEHICLE WITH A CONTAINER

[75] Inventors: Kozo Yamada, Asaka; Yasuhiro Ohba, Kamifukuoka; Seiichi Matsui, Tokyo, all of Japan

[73] Assignee: Honda Giken Kogyo Kabushiki Kaisha, Tokyo, Japan

[21] Appl. No.: 157,387

[22] Filed: Jun. 9, 1980

[30] Foreign Application Priority Data

Jun. 11, 1979 [JP] Japan .................. 54-79207[U]

[51] Int. Cl.³ .................. B62D 61/08; B60R 11/00
[52] U.S. Cl. .................. 280/62; 180/215; 280/289 A; 280/769; 296/37.1
[58] Field of Search .................. 280/289 A, 62, 769; 296/37.1; 180/215

[56] References Cited

U.S. PATENT DOCUMENTS

| | | | |
|---|---|---|---|
| 1,441,795 | 1/1923 | Gessel | 280/769 |
| 3,777,955 | 12/1973 | Davies | 280/289 A |
| 3,924,706 | 12/1975 | Figura | 180/215 |

FOREIGN PATENT DOCUMENTS 1022791 3/1966 United Kingdom .......... 280/289 A

*Primary Examiner*—Robert R. Song
*Attorney, Agent, or Firm*—Irving M. Weiner; Pamela S. Burt; John L. Shortley

[57] ABSTRACT

A three-wheeled motor vehicle has a container for clothes and other things that is supported between a pair of channel-shaped bars extending rearwardly from the vehicle frame between a pair of rear wheels. The container has a pair of front resilient rollers disposed laterally thereof and fitted in a pair of respective channels fixed to and disposed in the channel-shaped bars, and a pair of rear resilient rollers fitted in the channel-shaped bars. The front resilient rollers are retained against forward movement by front vertical portions of the channels. The rear resilient rollers are retained against rearward movement by stop plates on a U-shaped guard fastened to the channel-shaped bars. The container is stably supported on the bars by the resilient rollers against vibrations and impacts.

7 Claims, 6 Drawing Figures

THREE-WHEELED VEHICLE WITH A CONTAINER

BACKGROUND OF THE INVENTION

1. Field of the Invention

The present invention relates to a three-wheeled vehicle having a container disposed between the rear wheels thereof for carrying clothes, helmets and other items.

2. Description of Relevant Art

There have been known motorized three-wheeled vehicles commonly referred to as "swamp buggies" having low-pressure, wide-tread tires for off the road travel or use over swampy or muddy terrain. Since such vehicles are normally used for sports, they are not provided with containers such as for clothes, helmets and other items. Although tools are somewhat placed in bags fastened suitably to the vehicles, such bags are necessarily small in size and cannot accommodate relatively large-sized items. The three-wheeled vehicle has a relatively large space defined between the rear wheels because a rear-wheel driving mechanism and an exhaust system of an engine arranged in a region of a rear axle necessarily results in a relatively long distance between the rear wheels, and the rear axle is disposed below a rider's seat at some distance therefrom. Such defined space, however, has not been utilized heretofore.

SUMMARY OF THE INVENTION

According to the present invention, a container is supported between a pair of parallel spaced channel-shaped bars extending rearwardly from a vehicle frame between a pair of rear wheels thereof. A pair of channels are fixed to and disposed in the channel-shaped bars, respectively, in locking arrangement with a pair of resilient rollers mounted respectively on a pair of lateral pins on the container. A U-shaped guard is mounted on the bars rearwardly of the container and has a pair of stop plates extending toward each other across the bars in locking engaggement with a pair of resilient rollers, respectively, mounted on a pair of lateral pins on the container.

It is an object of the present invention to provide a three-wheeled vehicle having a container, for example, conveniently located between a pair of rear wheels of the vehicle.

Another object of the present invention is to provide a convenient container that is easily mountable on and detachable from a three-wheeled vehicle.

Still another object of the present invention is to provide such a container that can be supported reliably and will remain in stable position, despite vibrations on a three-wheeled vehicle.

The above and other objects, features and advantages of the present invention will become apparent from the following description when taken in conjunction with the accompanying drawings which illustrate a preferred embodiment of the invention by way of example.

DETAILED DESCRIPTION

Figure 1:
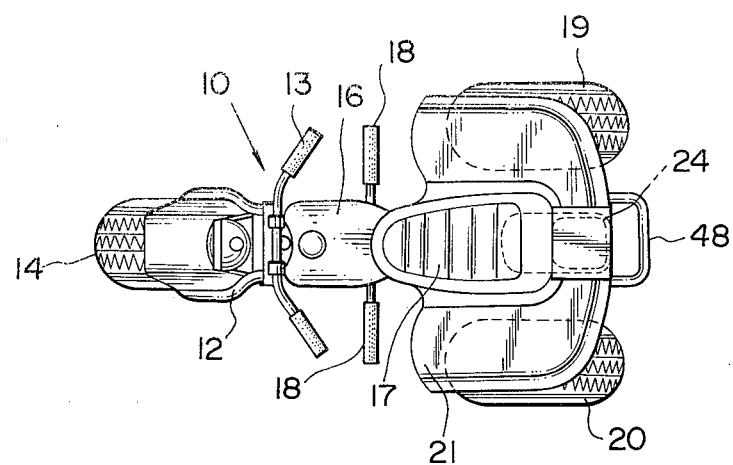
FIG. 1 is a plan view of a three-wheeled vehicle according to the present invention.
Figure 2:
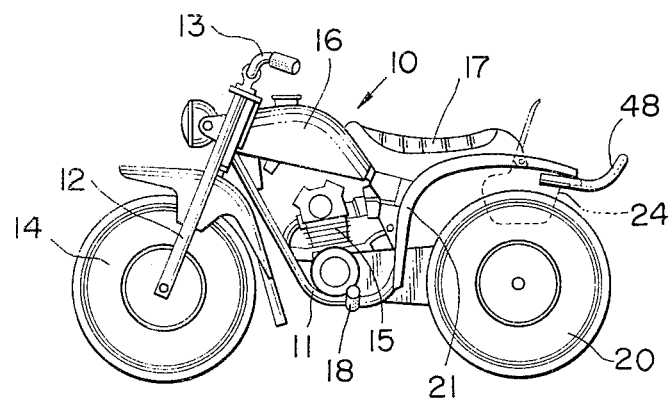
FIG. 2 is a side elevational view of the three-wheeled vehicle shown in FIG. 1.

As shown in FIGS. 1 and 2, a three-wheeled vehicle 10 known as a "swamp buggy" comprises a vehicle frame 11 including a front fork 12 which supports at an upper end thereof a steering bar handle 13 and at a lower end thereof a front wheel 14 with a low-pressure tire. The vehicle frame 11 supports a drive unit 15 including an internal combustion engine and a transmission, a fuel tank 16, a driver's seat 17 located rearwardly of the fuel tank 16, and a pair of foot rests 18, 18 disposed substantially below the driver's seat 17. The vehicle frame 11 also supports a pair of parallel rear wheels 19, 20 each with a low-pressure tire, which are rotatively drivable by the drive unit 15. The rear drive wheels 19, 20 are covered by a rear fender 21 extending rearwardly from the vehicle frame 11.

Figure 3:
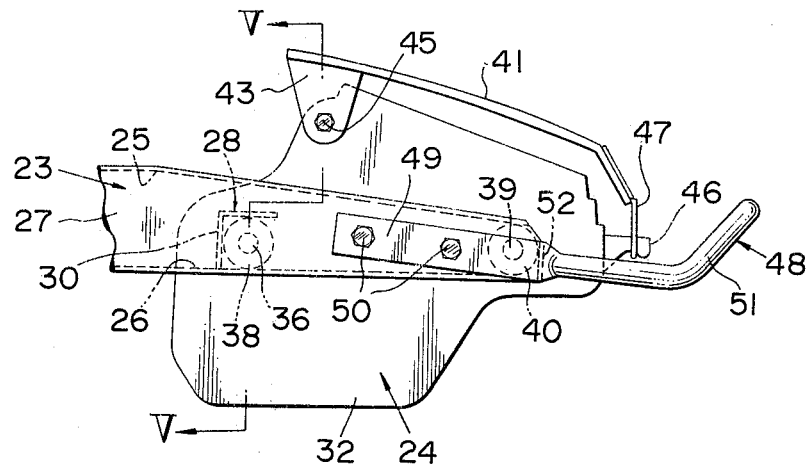
FIG. 3 is an enlarged side elevational view of a container mounted on the vehicle.
Figure 4:
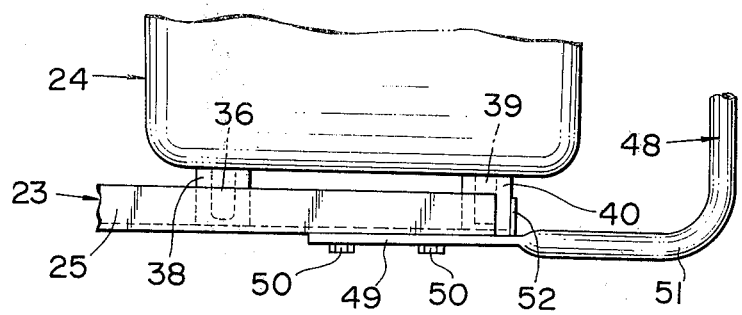
FIG. 4 is a fragmentary plan view of the container of FIG. 3.
Figure 5:
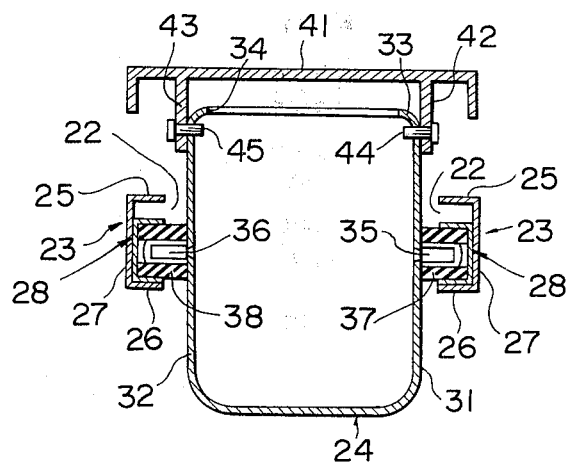
FIG. 5 is a cross-sectional view taken along line V—V of FIG. 3.

As illustrated in FIGS. 3 through 5, a pair of channel-shaped bars 23 extend rearwardly from the vehicle frame 11 in parallel spaced relation between the rear drive wheels 19, 20 and jointly support therebetween a container 24 for clothes and other things. As best shown in FIG. 5, each channel-shaped bar 23 comprises a pair of upper and lower horizontal plates 25, 26 and a vertical sidewall 27 interconnecting the upper and lower plates 25, 26; the plates 25, 26 and the sidewall 27 jointly defining a slot 22. The channel-shaped bars 23 open toward each other. In FIG. 3, the upper plate 25 is inclined progressively downwardly toward the lower plate 26 such that each channel-shaped bar 23 becomes tapered toward the distal end thereof. A pair of mutually facing channels 28 are fixed to and disposed in the channel-shaped bars 23, respectively, each of the channels 28 including a front vertical portion 30 as shown in FIG. 3. The height of each channel 28 is substantially the same as that of the channel-shaped bar 23 at its distal end.

The container 24 includes a pair of spaced sidewalls 31, 32 and an upper plate 33 as illustrated in FIG. 5, the upper plate 33 having therein an opening 34. A pair of front lateral pins 35, 36 are mounted on the sidewalls 31, 32, respectively, and project away from each other. A pair of resilient rollers 37, 38 such as of rubber are fitted over the front lateral pins 35, 36, respectively, and are fitted or ride in the channels 28 in pressing contact therewith. The container 24 also has a pair of rear lateral pins 39 (one shown) mounted respectively on the sidewalls 31, 32. The rear lateral pins 39 support thereon a pair of respective resilient rollers 40 (one shown) such as of rubber, which are fitted in the channel-shaped bars 23 in pressing contact therewith.

Figure 6:
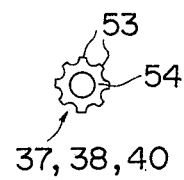
FIG. 6 is an end view of a resilient roller mounted on the container.

Each of the resilient rollers 37, 38, 40 has a plurality of peripheral ridges 53 (FIG. 6) extending radially outwardly from a cylindrical body 54.

A cover plate 41 includes a pair of brackets 42, 43 pivotably coupled by a pair of respective pins 44, 45 to the respective sidewalls 31, 32 of the container 24 so that it may itself be pivotably movable between a lowered position and a raised position, about the pins 44, 45. The cover plate 41 when brought into the lowered position thereof covers or overhangs the opening 34 of the container 24. The cover plate 41 is held in the lowered position by a rubber strap 47 fastened to the cover plate releasably from a hook 46 projecting rearwardly from the container 24.

As shown in FIGS. 3 and 4, a U-shaped guard 48 formed of a pipe is disposed rearwardly of the container 24 and includes a pair of flattened attachment arms 49 (one shown) each fastened by a pair of bolts 50 to the sidewall 27 of one of the channel-shaped bars 23. The U-shaped guard 48 also includes a pair of stop plates 52 (one shown) extending laterally toward each other across the channel-shaped bars 23. Each of the stop plates 52 is located between the flattened attachment arm 49 and a pipe portion 51 of the U-shaped guard 48 and adjacent to the distal end of one of the channel-shaped bars 23.

In assembly, the container 24 is inserted between the channel-shaped bars 23 in a direction to allow the front resilient rollers 37, 38 to be placed between the upper and lower plates 25, 26 of the bars 23 at their distal ends. As the containers 24 is further moved forwardly in the leftward direction in FIG. 3, the rear resilient rollers 40 also enter the distal ends of the bars 23 so as to be placed between the upper and lower plates 25, 26, whereupon the front resilient rollers 37, 38 are pressed against the front vertical portions 30 of the channels 28 in locking engagement therewith, which vertical portions 30 prevent the containers 24 from further moving forwardly. With the container 24 thus assembled onto the channel-shaped bars 23, the ridges 53 of the resilient rollers 37, 38, 40 are resiliently squeezed by the channels 28 and the upper and lower plates 25, 26 of the bars 23. Then, the U-shaped guard 48 is attached to the bars 23 with the stop plates 52 lockingly engaging the rear resilient rolles 40 to hold the rollers 40 within the bars 23 against rearward movement.

The assembled container 24 is thus held securely in locking engagement with the bars 23 with increased positional stability against wobbling. More specifically, the container 24 is prevented by the front vertical portions 30 of the channels 28 from forward movement, by the stop plates 52 from rearward movement, by the channels 28 and the upper and lower plates 25, 26 from vertical movement, and by the sidewalls 27 of the channel-shaped bars 23 from lateral horizontal movement. With such an arrangement, the container 24 can be securely assembled on the bars 23 with utmost ease, is stably supported against wobbling, and is resiliently mounted on the bars 23 for insulation from vibrations or impacts.

Although a certain preferred embodiment has been shown and described in detail, it should be understood that changes and modifications may be made therein without departing from the scope of the appended claims.

We claim:

1. A three-wheeled vehicle, comprising:
   a vehicle frame;
   a front wheel rotatably mounted on said frame;
   a pair of parallel rear wheels rotatably mounted on said frame;
   a container disposed rearwardly of said frame between said rear wheels;
   a pair of parallel spaced bars extending rearwardly from said frame, said bars supporting said container therebetween;
   a U-shaped guard mounted on said bars and extending rearwardly of said container; said container being provided thereon with first and second spaced resilient means;
   said bars being provided thereon with first locking means held in locking engagement with said first resilient means; and
   said guard being provided thereon with second locking means held in locking engagement with said second resilient means.

2. A three-wheeled vehicle according to claim 1, each of said bars being channel-shaped and opening toward each other, said first locking means comprising a pair of channels fixed to and disposed in said channel-shaped bars, respectively, said container having a first pair of lateral pins, and said first resilient means comprising a pair of resilient rollers mounted on said lateral pins and riding in said channels.

3. A three-wheeled vehicle according to claim 2, each of said resilient rollers having a plurality of peripheral ridges extending radially outwardly and held in pressing contact with said channels.

4. A three-wheeled vehicle according to claim 1, each of said bars being channel-shaped and opening toward each other, said second locking means comprising a pair of stop plates projecting toward each other across said channel-shaped bars, said container having a second pair of lateral pins, and said second resilient means comprising a pair of resilient rollers mounted on said lateral pins and fitted in said bars by said stop plates, respectively.

5. A three-wheeled vehicle according to claim 4, each of said resilient rollers having a plurality of peripheral ridges extending radially outwardly and held in pressing contact with said bars and said stop plates.

6. A three-wheeled vehicle according to claim 1, said container having an upper opening, including a cover plate pivotally connected to said container in overhanging relation to said opening, and a resilient strap for connection between said container and said cover plate.

7. A three-wheeled vehicle according to claim 1, wherein:
   a drive unit operatively cooperating with said rear wheels is mounted on said vehicle frame, said drive unit comprising an internal combustion engine and a transmission.

* * * * *